No. 888,529. PATENTED MAY 26, 1908.
W. L. PLUMB.
DISINFECTING ATTACHMENT FOR CARPET SWEEPERS.
APPLICATION FILED NOV. 30, 1906.
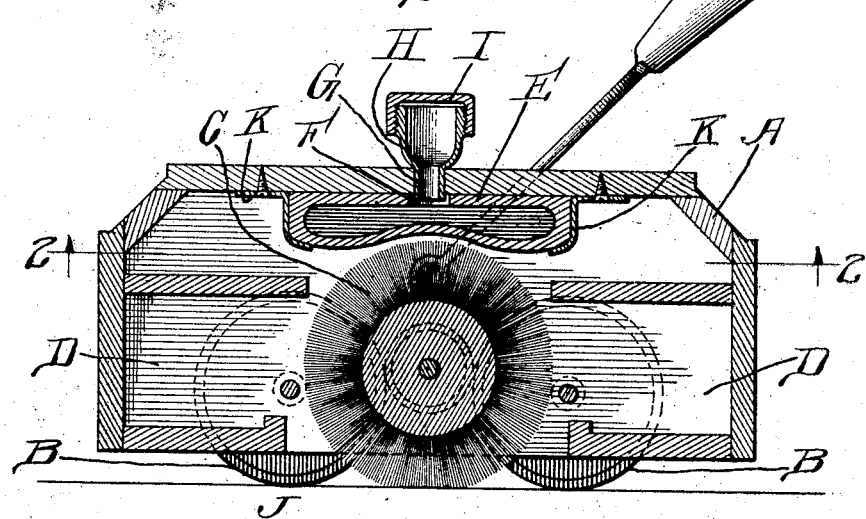
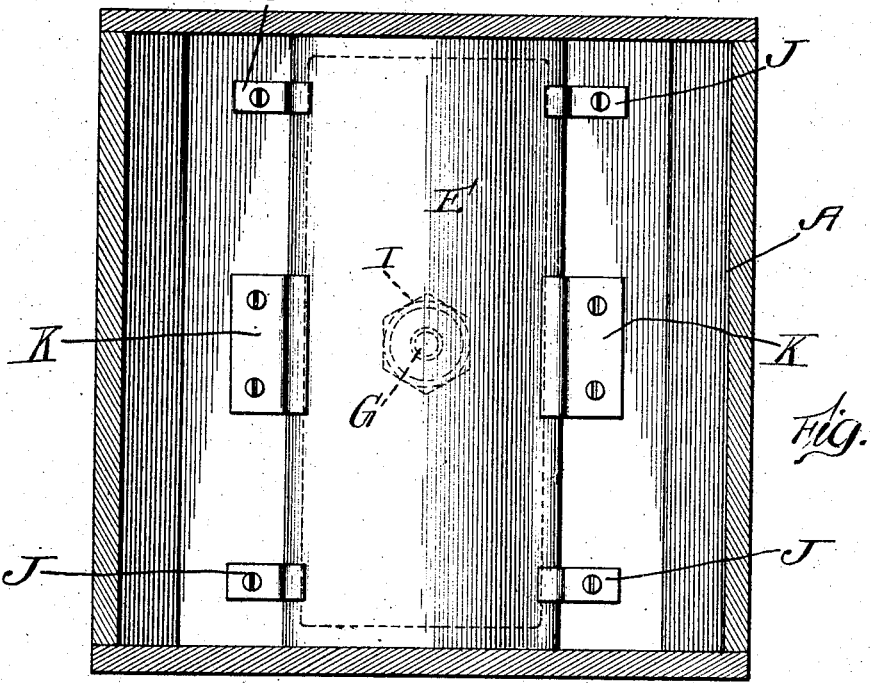
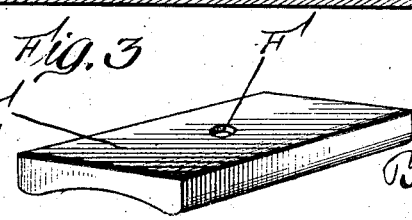
Witnesses:
Inventor:
Walter L. Plumb.

UNITED STATES PATENT OFFICE.

WALTER L. PLUMB, OF NEW YORK, N. Y., ASSIGNOR OF ONE-HALF TO CLAUDE WATSON TURNER, OF NEW YORK, N. Y.

DISINFECTING ATTACHMENT FOR CARPET-SWEEPERS.

No. 888,529.      Specification of Letters Patent.      Patented May 26, 1908.

Application filed November 30, 1906. Serial No. 345,727.

*To all whom it may concern:*

Be it known that I, WALTER L. PLUMB, a citizen of the United States, residing at New York city, in the borough of Manhattan and State of New York, have invented certain new and useful Improvements in Disinfecting Attachments for Carpet-Sweepers, of which the following is a specification.

This invention relates to improvements in carpet-sweepers and is designed to prevent the spread of disease, which is likely to result from the stirring up and scattering about of germ laden dust, which results from the use of the ordinary carpet-sweeper, and to deodorize and disinfect the sweepings.

In the accomplishment of this object I provide a receptacle to be attached to and carried by a carpet-sweeper, and which is preferably located within the casing of said sweeper. This receptacle is designed to contain a quantity of disinfecting fluid such as, for instance, formaldehyde.

In the drawings accompanying this specification,—Figure 1 shows a central, vertical cross-section of a carpet-sweeper fitted with my disinfecting device. Fig. 2 shows a horizontal section of the same, the section being taken on the line 2—2 of Fig. 1, looking in the direction indicated by the arrows; and Fig. 3 is a perspective view of the germicide container removed from the sweeper.

In the several figures of the drawings like reference characters indicate the same parts throughout.

A is the body or casing of the sweeper, which is provided with driving wheels or rollers B.

C indicates the revolving brush, which loosens the dirt from the carpet and deposits the same in the dust-boxes D.

Within the space between the brush C and the top of the casing A I place the container or receptacle E, which is made of porous material, preferably unglazed earthenware. The bottom of the receptacle E is preferably curved upwardly and in the concavity of the bottom revolves the brush C, preferably slightly out of contact with this curved bottom, although, if desired, the ends of the bristles of the brush may engage the bottom of the receptacle. The receptacle E is closed at the top, except that a small opening F is provided, through which the liquid disinfectant may be poured. A corresponding opening G is provided in the top of the casing, and into this is inserted a short tube H, preferably funnel-shape, the top of this tube being preferably screw-threaded and provided with a screw-cap I.

Suitable means are provided for removably holding the receptacle E in place in the casing of the sweeper. Such holding means may consist of clips J and K, of spring metal, secured at their upper ends to the top of the casing and having their lower ends adapted to hook under the bottom of the receptacle, to hold the latter, or to be sprung back so as to permit the receptacle to be removed from the casing with very little trouble.

In the use of this device, a quantity of volatile disinfecting or germicidal fluid, such as formaldehyde, will be poured through the funnel H into the receptacle E, the cap I being then screwed on, to prevent spilling of the liquid. The casing E being of porous material, the liquid will be absorbed by and will exude through the walls of the receptacle mostly in the form of a gas, and may moisten the exterior of the same. The brush C, rotating rapidly close to the lower side of the receptacle E, will disseminate this liquid or gas through the dust, the sweepings and the carpet. The dust which is taken up by the brush and deposited in the dust-boxes D will be thoroughly disinfected. This dust, as well as the dust which is raised by the movement of the machine over the carpet and which is not caught by the machine, will, by reason of the germicidal qualities of the fluid used, be made harmless so far as the propagation and spread of disease is concerned.

Various modifications in the form of receptacle will suggest themselves. Such details as the method of securing the receptacle to the casing of the sweeper may be modified to suit the requirements of the particular style of sweeper used.

It will be observed as a characteristic feature of my invention that the volatile disinfectant is poured in fluid form directly into the containing chamber of the receptacle E. The under side of this receiving chamber is concaved, as shown, and the ends of the receiving chamber are arranged, if desired, so as to abut the ends of the casing A. The top of the chamber E, when arranged in its preferred form, is covered by the top of the carpet sweeper casing so that there is no substantial evaporation from the top of the chamber, while the edges of the chamber have but a limited surface and are partially covered by the metal clips, so that the evaporation from the receptacle E is relatively slight when the sweeper is at rest, but, when the sweeper is in operation, the rotation of the brush carries the disinfecting or treating gases from the concavity at the under side of the receptacle E and intermingles them with the dust which is swept from the floor or carpet by the brush.

While unglazed earthenware is a suitable material for use in my invention, as it will serve as a wall of the receptacle which contains the treating fluid and at the same time will permit of a retarded exudation of the fluid in such a manner that the fluid will be evaporated as it reaches the exterior of the earthenware wall so that the consumption of the treating fluid will be reduced to a minimum and the fluid will pass from the receptacle only in the form of a vapor which is disseminated through the dust and not in the form of a fluid which wets down or lays the dust, nevertheless other substances having these qualities may be used in making the receptacle and so where, in the claims, I use the term "unglazed earthenware", it should be understood that I mean thereby either unglazed earthenware or any similar substances suitable to form to a wall of the fluid receptacle while at the same time permitting of the retarded exudation and vaporous dissemination of the treating fluid as above noted.

Various modifications in the means for utilizing the principle of this invention may be used, but

What I claim and desire to secure by Letters Patent is:

1. The combination with a sweeping machine, comprising sweeping means of a hollow receptacle of unglazed earthenware arranged to receive a disinfecting fluid a portion of which receptacle is arranged in proximity to said sweeping means and constructed so as to permit the fluid to exude and be disseminated through the dust raised by the operation of the sweeping machine.

2. The combination with a sweeping machine comprising a brush, of a hollow receptacle of unglazed earthenware arranged with one wall adjacent to the brush of the machine whereby the vapor which is evaporated from said wall when said receptacle is supplied with a volatile disinfectant will be disseminated through the dust raised by the operation of said machine, and whereby such evaporation will be facilitated by the current created by the operation of said brush.

3. The combination, with a sweeping machine, of a hollow receptacle provided with a bottom of unglazed earthenware, said bottom being concaved so as to form a cavity closed at its ends and adjacent to the brush through which cavity the brush will travel during the operation of the machine.

4. In a sweeping machine the combination, with a rotatable brush, of means for rotating said brush, and means formed of unglazed earthenware for receiving a volatile disinfectant and permitting the same to be evaporated from one surface of said earthenware adjacent to said brush, all so arranged that said brush will disseminate said disinfecting vapor through the dust raised by the operation of the sweeping machine.

5. The combination with a sweeping machine comprising sweeping means, of means formed of unglazed earthenware for receiving a disinfecting fluid having a surface thereof arranged in such proximity to said sweeping means that the disinfecting fluid evaporated from such surface will be disseminated through the dust raised by the operation of said machine, another surface of said earthenware being inclosed so as to retard the evaporation of said disinfectant from such surface.

WALTER L. PLUMB.

Witnesses:
HARRY A. ANDERSON,
CLAUDE W. TURNER.